(12) United States Patent
Geisberger (10) Patent No.: US 8,824,337 B1
(45) Date of Patent: Sep. 2, 2014

(54) ALTERNATE DIRECTIONS IN HIERARCHICAL ROAD NETWORKS

(75) Inventor: Robert Geisberger, Zurich (CH)

(73) Assignee: Google Inc., Mountain View, CA (US)

( * ) Notice: Subject to any disclaimer, the term of this patent is extended or adjusted under 35 U.S.C. 154(b) by 105 days.

(21) Appl. No.: 13/420,165

(22) Filed: Mar. 14, 2012

(51) Int. Cl.
*H04L 12/28* (2006.01)
*H04L 12/26* (2006.01)
*H04J 1/16* (2006.01)
*H04J 3/14* (2006.01)
*G01C 21/00* (2006.01)
*G01C 21/34* (2006.01)

(52) U.S. Cl.
USPC ........... 370/255; 370/256; 370/408; 370/238; 701/410; 701/533; 701/416

(58) Field of Classification Search
USPC .......... 370/238, 241–255; 701/400, 408, 416, 701/532, 533; 707/716
See application file for complete search history.

(56) References Cited

U.S. PATENT DOCUMENTS

| 2010/0262359 | A1* | 10/2010 | Motoyama | 701/200 |
| 2011/0251789 | A1* | 10/2011 | Sanders et al. | 701/202 |
| 2012/0310523 | A1* | 12/2012 | Delling et al. | 701/411 |

* cited by examiner

*Primary Examiner* — Un C Cho
*Assistant Examiner* — Peian Lou
(74) *Attorney, Agent, or Firm* — McDermott Will & Emery LLP (57) ABSTRACT

Methods and systems for determining shortest paths between a source node and a target node in a road network are disclosed. An example method includes determining a hierarchy of nodes with a number of levels of a first graph and calculating a first shortest path between the source node and the target node traversing a meeting node in the first graph. The number of levels in the first graph is reduced. One or more second shortest paths between the source node and the target node traversing one or more meeting nodes in the second reduced graph is determined. The first shortest path is assigned as a primary route and the one or more second shortest paths are assigned as alternate routes.

25 Claims, 9 Drawing Sheets

FIG. 7B

ALTERNATE DIRECTIONS IN HIERARCHICAL ROAD NETWORKS

BACKGROUND

1. Field

The embodiments relate generally to hierarchical routes and more particularly, to road networks in a computing environment.

2. Background Art

The road network can be represented as a graph with nodes and arcs. A path is a sequence of nodes traversed from a source node to a target node. A cost, such as the travel time, is associated with an arc connecting two nodes. In the case of a road network, the shortest path computation may determine a path whose sum of arc costs is the smallest among all paths between the source and target nodes.

Because a typical graph of a road network may contain millions of nodes, the process to compute the shortest path can be time consuming and computational expensive depending on the computational algorithm utilized. The problem is exacerbated in cases where a system frequently needs to provide several alternative paths to the user. A good candidate of alternate path is a meaningful path that sufficiently differs from the shortest path and other alternates, but may be a bit more expensive. Accordingly, computation of alternates in the road network is even more expensive.

Some conventional systems attempt to address these issues using a bidirectional search: a forward search from the source node and a backward search from the target node. The forward and backward searches meet at an intermediate meeting node between the source and target nodes. An alternate may be the concatenation of two shortest paths: from the source node to the meeting node, and from the meeting node to the target node. Such bidirectional search may result in improved performance and reduced memory consumptions. However, many efficient bidirectional searches that are faster in finding the shortest paths lead to less alternative paths due to the limited number of meeting nodes identified. Therefore, while the conventional systems may be able to quickly find a single shortest path, they fail to efficiently identify an optimal path with adequate alternates in the road network.

BRIEF SUMMARY

Embodiments relate to determining shortest paths between a source node and a target node in a road network. In an embodiment, a hierarchy of nodes with a number of levels of a first graph is determined. Each node in the hierarchy of nodes is assigned to a level based on a priority factor of the node. A first shortest path between the source node and the target node traversing a meeting node is calculated in the first graph. Each node in the first shortest path traverses to a node of an equal or higher level in the direction from the source node to the meeting node and from the target node to the meeting node. The number of levels in the first graph is reduced, with one or more levels of the first graph consolidated to form reduced levels in a second reduced graph. One or more second shortest paths between the source node and the target node traversing one or more meeting nodes in the second reduced graph is determined. Each node in the second shortest paths traverses to a node of an equal or higher reduced level in the direction from the source node to the meeting nodes and from the target node to the meeting nodes. Thus, the second shortest paths are a concatenation of the shortest paths from the source node to the one or more meeting nodes, and from the one or more meeting nodes to the target node. The first shortest path is assigned as a primary route and the one or more second shortest paths are assigned as alternate routes.

In another embodiment, a system for determining shortest paths between a source node and a target node in a graph includes a level determiner, configured to determine a hierarchy of nodes with a number of levels contained in a first graph, each node in the hierarchy of nodes assigned to a level based on a priority factor of the node. The system further includes a first path calculator, configured to calculate a first shortest path between the source node and the target node traversing a meeting node in the first graph and each node in the first shortest path traverses to a node of higher level in the direction from the source node to the meeting node and from the target node to the meeting node. The system also includes a level reducer, configured to reduce the number of levels in the first graph, so that one or more levels of the graph are consolidated to form reduced levels in a second reduced graph. Furthermore, the system includes a second path calculator, configured to calculate one or more second shortest paths between the source node and the target node traversing one or more meeting nodes in the second reduced graph. Each node in the second shortest paths traverses to a node of higher reduced level in the direction from the source node to the meeting nodes and from the target node to the meeting nodes. Thus, the second shortest paths are a concatenation of the shortest paths from the source node to the one or more meeting nodes, and from the one or more meeting nodes to the target node. Finally, the system includes a path assignor, configured to assign the first shortest path as a primary route and the one or more second shortest paths as alternate routes.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described in this application. Such embodiments are presented for illustrative purposes only. Additional embodiments will be apparent to persons skilled in the relevant art(s) based on the information contained in this document.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

The accompanying drawings, which are incorporated herein and form part of the specification, illustrate the embodiments of the present invention and, together with the description, further serve to explain the principles of embodiments and to enable a person skilled in the relevant art(s) to make and use such embodiments.

DETAILED DESCRIPTION

Embodiments relate to determining shortest paths between a source node and a target node in a graph using an alternate directions module.

An alternate directions module, described in the embodiment herein, is capable of determining a hierarchy of nodes with a number of levels contained in a first graph, each node in the hierarchy of nodes assigned to a level based on a priority factor of the node.

The system calculates a first shortest path between the source node and the target node traversing a meeting node in the first graph, with each node in the first shortest path traversing to a node of an equal or higher level in the direction from the source node to the meeting node and from the target node to the meeting node. The system further reduces the number of levels in the first graph, consolidating one or more levels of the first graph to form reduced levels in a second reduced graph. In the similar fashion, the system calculates one or more second shortest paths between the source node and the target node traversing one or more meeting nodes in the second reduced graph. Each node in the second shortest paths traverses to a node of an equal or higher reduced level in the direction from the source node to the meeting nodes and from the target node to the meeting nodes. Upon obtaining the shortest paths, the system assigns the first shortest path as a primary route and the one or more second shortest paths as alternate routes.

As will be described in further detail below, embodiments can provide adequate alternate directions that are sufficiently different and also not much longer than the shortest path. Moreover, embodiments are conceptually simple and adaptive to live update and dynamic routing, such as traffic delays.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

System

Figure 1:
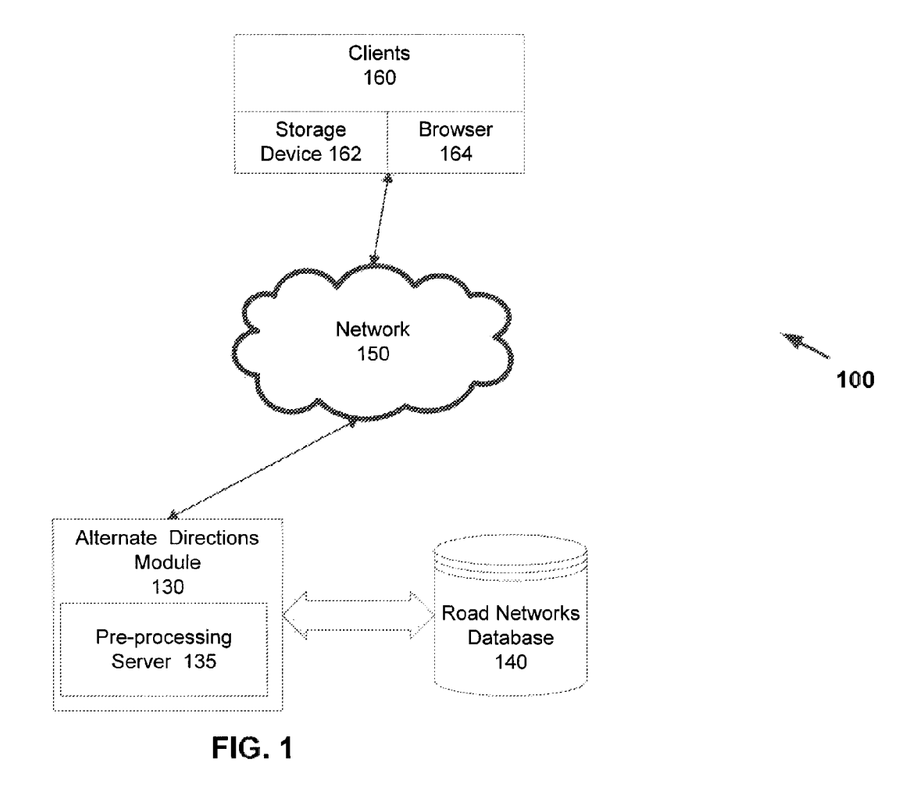
FIG. 1 is a diagram illustrating a system for determining shortest paths between a source node and a target node in a graph, according to an embodiment.

FIG. 1 illustrates a system 100 according to an embodiment. Referring to FIG. 1, system 100 includes an alternate directions module 130, a network 150, and clients 160.

Clients 160 communicate with one or more alternate directions module 130 over the network 150. Although only one alternate directions module 130 is shown, more modules may be used as necessary. Network 150 may be any network or combination of networks that carry data communication. Such network can include, but is not limited to, a local area network, medium area network, and/or wide area network such as the Internet.

Client 160 includes a storage device 162 and a browser 164. Browser 164 may be any application software or program designed to enable users to access, retrieve and view a map, a graph, a road network and other resources on the Internet. Storage device 162, which will be described in detail with respect to FIG. 5, can be any device for recording and storing information, which includes but is not limited to, flash memory, magnetic tape and optical discs.

As illustrated in FIG. 1, clients 160 can send data requests to alternate directions module 130 for further processing. Alternate module 130 further includes a preprocessing server 135 which is configured to preprocess a weighted graph into a hierarchy of nodes with a plurality of levels, and reduce the levels of the nodes to facilitate computation and finding alternate directions.

Alternate directions module 130 can be software, firmware, or hardware or any combination thereof in a computing device. System 100 can be implemented on or implemented by one or more computing devices. As will be described with respect to FIG. 5, a computing device can be any type of computing device having one or more processors. For example, a computing device can be a computer, server, workstation, mobile device (e.g., a mobile phone, personal digital assistant, navigation device, tablet, laptop or any other user carried device), game console, set-top box, kiosk, embedded system or other device having at least one processor and memory. A computing device may include a communication port or I/O device for communicating over wired or wireless communication link(s).

Figure 2A:
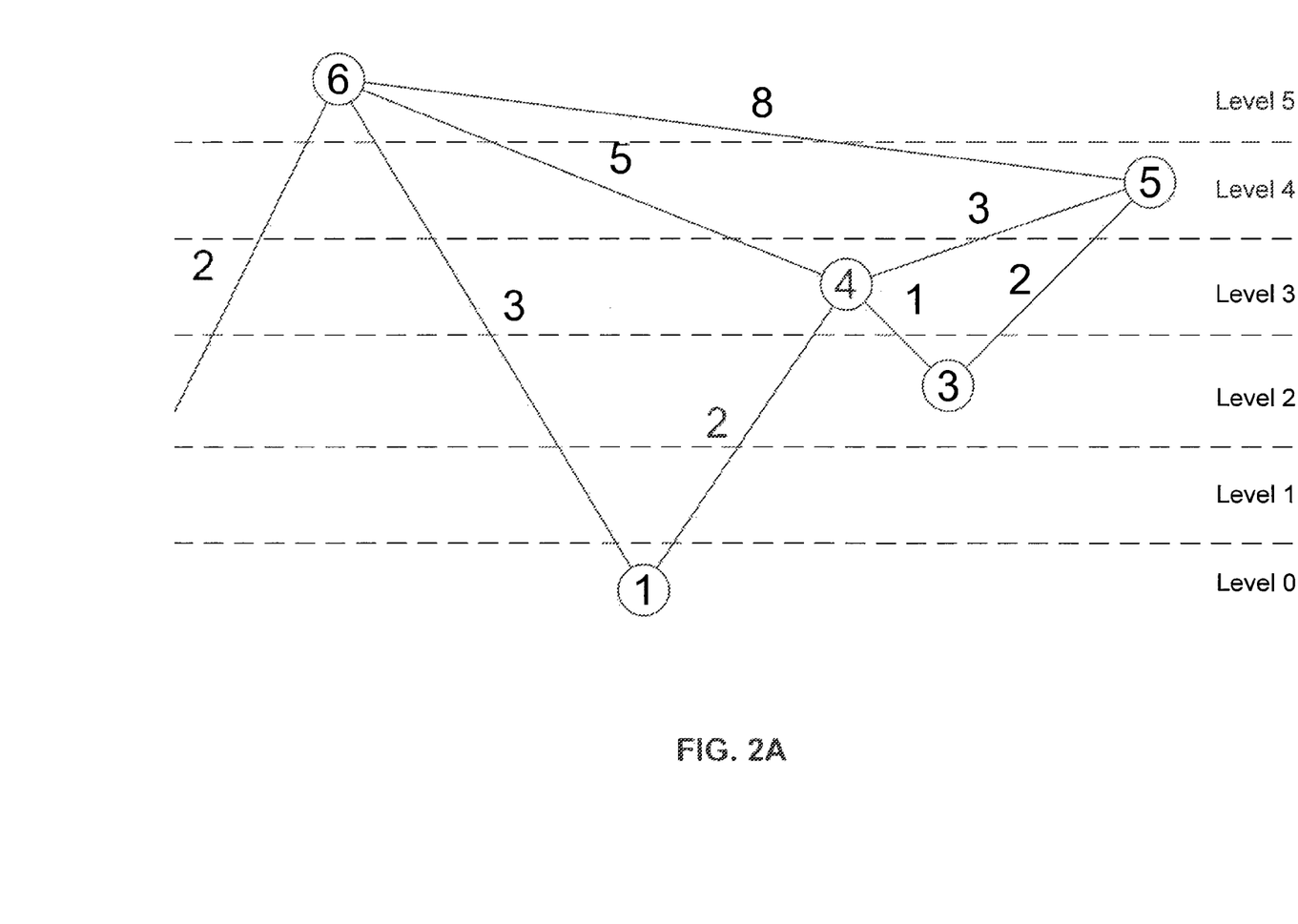
FIGS. 2A-2B are illustrations of example graphs before and after the reduction of node levels using an alternate directions module, according to an embodiment.

FIG. 2A is an illustration of example graphs before the reduction of node levels using an alternate directions module, according to an embodiment. In this example, a graph representing a road network with 6 nodes is illustrated. Each arc connecting two nodes is associated with a cost value, corresponding to a distance or travel time. For example, the arc between node 2 and node 6 is associated cost value 2. A path may traverse nodes 2, 6 and 5. Alternatively, another path may traverse nodes 2, 6, 1, 4, 3, and 5 consecutively. Thus, it is not necessary to traverse all nodes to find a shortest path.

FIG. 2A further shows a hierarchy of nodes with a number of levels. Given that each node in FIG. 2A is associated with a different weight or priority, nodes 1 to 6 reside on different levels. For example, node 1 is on level 0, which is the lowest level in the graph. Node 2 to 5 reside on levels 1, 2, 3 and 4, respectively, while node 6 is on level 5, the highest level in the graph. To find a shortest path using a bidirectional search method such as a Highway Hierarchies or a Contraction Hierarchies method, a forward search from the source node to a target node and a backward search from the target node to the source node are conducted. The forward search and backward search meet at one or more intermediate meeting nodes between the source node and the target node, representing alternate routes from source to target. Due to the fact that the forward and backward searches use nodes and arcs on the same or higher levels as they evolve, searching for shortest path of a hierarchical graph, such as using a Contraction Hierarchy method, does not find adequate meeting modes. Accordingly, the users are not presented with adequate options of alternate routes.

Figure 2B:
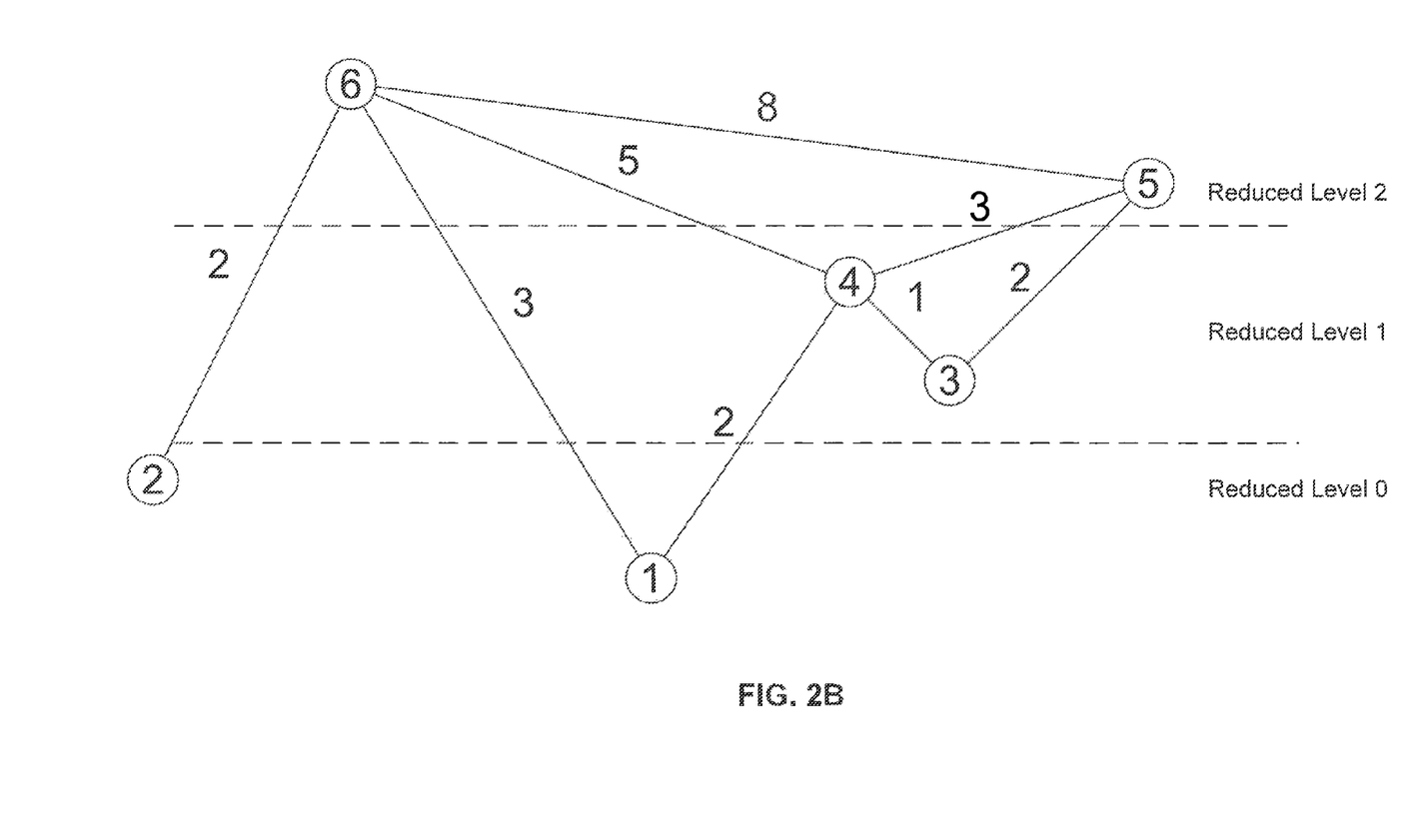

Embodiments address this issue by reducing the number of levels in the hierarchical graphs. FIG. 2B is an illustration of example graph after the reduction of node levels using an alternate directions module, according to an embodiment. Referring to FIG. 2B, the six nodes originally residing on six levels in FIG. 2A, have been reduced to 3 levels: with reduced level 0 containing nodes 1 and 2; with reduced level 1 containing nodes 3 and 4; and with reduced level 2 containing nodes 5 and 6. Each reduced level contains more nodes than the original level does and a search can both go up and down the node hierarchy in the same reduced level. For this reason, reducing levels increases the number of meeting nodes the forward and backward searches can find. For example, in the original graph of FIG. 2A, a forward or backward search can traverse from node 4 to node 5, which resides on a higher level than node 4. In contrast, in the reduced graph of FIG. 2B, node 4 at reduced level 1 can traverse both to node 5 of reduced level 2, and node 3 of the same reduced level where node 4 resides. Therefore, more alternatives within the same reduced level provide opportunity to find more meeting nodes in the forward and backward searches, corresponding to more alternate routes in a shortest path calculation.

Figure 3:
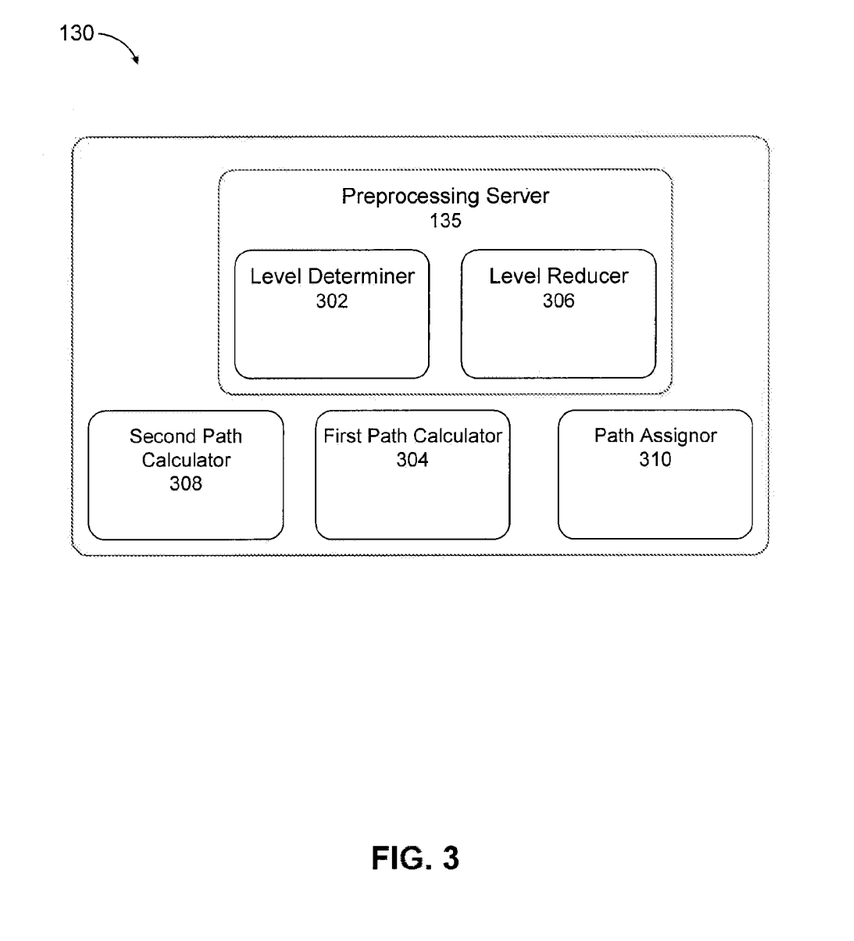
FIG. 3 illustrates elements of an alternate directions module, according to an embodiment.

FIG. 3 illustrates elements of an alternate directions module 130, according to an embodiment. In the example shown in FIG. 3, alternate directions module 130 includes a preprocessing server 135, a first path calculator 304, a second path calculator 308, and a path assignor 310.

Preprocessor server 135 prepares and preprocesses nodes in a hierarchical graph representing a road network from a source node and a target node. This hierarchical graph is considered as the first graph. Preprocessing server 135 further includes a level determiner 302 and level reducer 306. Level determiner 302 determines the levels of the nodes in the graph in order of their importance or priorities. In a hierarchical contraction method, for example, nodes of a weighted directed graph are numbered 1 . . . n in order of ascending "importance." Level determiner 302 uses a priority queue whose minimum element contains the node looking most attractive to be contracted next. In one embodiment, level determiner 302 uses an edge difference, the number of shortcuts introduced when contracting a node v minus the number of edges incident to v, to determine the position of the nodes in the priority queue. In another embodiment, to determine importance or priority of a node, level determiner 302 considers criteria such as uniformity to contract nodes everywhere in the graph in a uniform way, rather than to keep contracting nodes in a small region. In still another embodiment, level determiner 302 uses a linear combination of several terms or criteria together. One skilled in the relevant art would appreciate that these terms or criteria described are illustrative and other types of terms may be used to determine the position in the priority queue.

Based on the hierarchy of nodes generated by level determiner 302, first path calculator 304 may calculate a first shortest path between the source node and the target node traversing a meeting node in the first graph. Each node in the first shortest path traverses to a node of equal or higher level in the direction from the source node to the meeting node and from the target node to the meeting node.

For example, the first graph G (V,E) can be split into an upward graph G↑:=(V,E↑) with E↑:={(u, v)∈E:u<v} and a downward graph G↓:=(V,E↓) with E↓:={(u, v)∈E:u>v}. First path calculator 304 calculates a first shortest path from source node s to target node t, by performing a modified bidirectional Dijkstra shortest path search, including a forward search in G↑ and a backward search in G↓. If, and only if, there exists a shortest s-t path in the first graph, then both search scopes eventually meet at a node v that has the highest level of all nodes in a shortest s-t-path.

Level reducer 306 reduces the Lumber of levels in the first graph, so that one or more levels of the graph are consolidated to form reduced levels in a second reduced graph. According to one embodiment, level reducer 306 groups the lowest ten levels of the first graph into one reduced level, and then every subsequent thirty levels into another reduced level. Thus, levels 0-9 in the first graph are reduced into a new level 0 in the second reduced graph; levels 10-39 in the first graph are reduced into a new level 1, levels 40-79 in the first graph are reduced into a new level 2 in the second reduced graph, and so on. For example, the full hierarchical graph for Zurich in the first graph has about 400 levels and level reducer 306 may reduce it to about 14 levels. In another embodiment, the hierarchy of nodes in the first graph contain a first level including nodes within a first range of priority values and a second level including nodes within a second range of priority values, As a result of the level reduction, the second reduced graph contains a level including both the nodes within the first range of priority values and the nodes within the second range of priority values. One skilled in the relevant art can envision several variations to the example level reducing mechanism, as described above.

Based on the reduced second graph generated by level reducer 306, second path calculator 308 calculates one or more second shortest paths between the source node and the target node traversing one or more meeting nodes in the second reduced graph. Similar to the fashion performed by first path calculator 304, each node in the second shortest paths traverses to a node of an equal or higher reduced level in the direction from the source node to the meeting nodes and from the target node to the meeting nodes.

Reducing levels may increase the number of nodes the forward and backward search find, due to the fact that the search can go down in the original hierarchy of the first graph. For example, the search at the reduced level 1 can go from a node at original level 30 to 29 of the first graph, because both levels are in the reduced level 1 of the second reduced graph. Conversely, in the original forward and backward searches in the first graph, the searches would not go down a level, namely from level 30 to level 29. Accordingly, the reduced levels in the second graph allow users to find more meeting nodes, corresponding to more alternates as candidate second shortest paths between the source node and the target node.

Path assignor 310 assigns the first shortest path as a primary route and the one or more second shortest paths as alternate routes, obtained from first path calculator 304 and second path calculator 308 respectively. In one embodiment, path assignor 310 evaluates all the meeting nodes found by second path calculator 308 and filters the meeting nodes according to some criteria. For example, path assignor 310 compares the one or more second shortest paths with the first shortest path and ensures that the alternates are sufficiently different and not much longer than the primary shortest path. Alternatively, filtering may remove alternate routes containing cuspy routes that encompass meaningless U-turns or pointed arcs. A cuspy route may be characterized by a fixed point on a path that reverses its direction of motion. For example, if the query finds a shorter path than the sub-path on an alternate route, this alternate is considered to be cuspy.

In the event that filtering does not find adequate desirable alternates, a path modifier may be configured to unpack shortcuts contained in the second shortest paths found in the second reduced graph. The path modifier may be further configured to select nodes left and right of the one or more meeting nodes in the second reduced graph as new meeting nodes. The second shortest paths can be modified to concatenate the shortest paths from the source node to the new meeting nodes and from the new meeting nodes to the target node. For example, due to the fact that cusps usually occur around the meeting nodes, considering the nodes left and right of the meeting node as potential new meeting modes, and running a shortest path query from the source node to the new meeting nodes and from the new meeting nodes to the target node may yield more desirable alternate routes. In one embodiment, nodes located within a threshold distance can be considered as potential candidates for modified meeting nodes. In an example, the threshold distance may be 5% of the total distance of the shortest path to the left and right of the initial meeting nodes. The functionalities of the path modifier will be further illustrated in FIGS. 7A and 7B below.

In an example of a variation, embodiments of the elements of alternate directions module 130 in FIG. 3, as described herein may be further configured to run in parallel. Such parallel execution of these elements would greatly increase the efficiency and speed of alternate directions module 130.

Method

Figure 4:
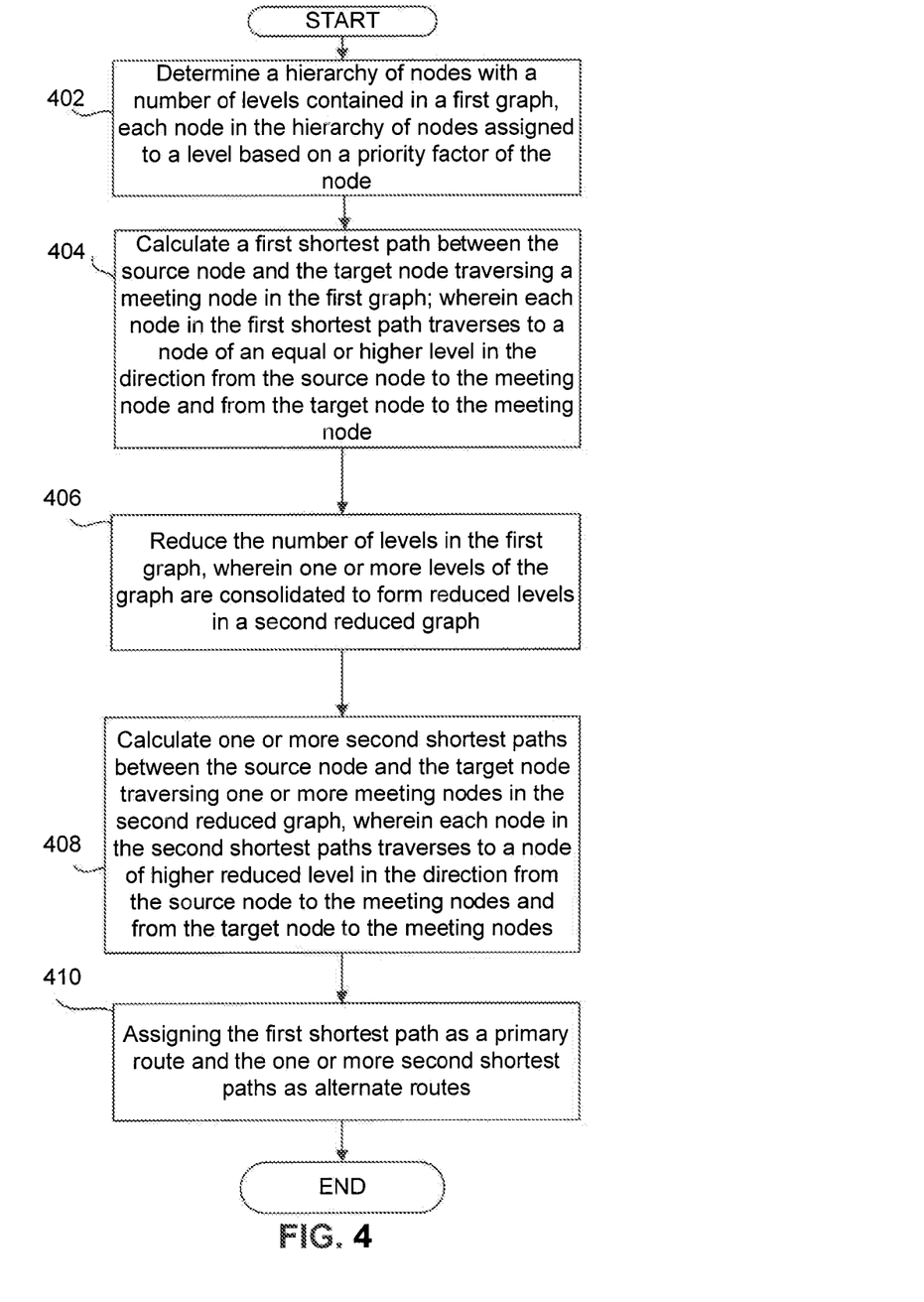
FIG. 4 is a flowchart of a method for determining shortest paths between a source node and a target node in a graph using an alternate directions module, according to an embodiment.

FIG. 4 is a flowchart of a method for determining shortest paths between a source node and a target node in a graph using an alternate directions module, according to an embodiment. For ease of explanation, the method in FIG. 4 will be described with respect to module 130 of FIG. 3, as described above. However, this method is not intended to be limited thereto.

At stage 402, a hierarchy of nodes with a number of levels is determined in a first graph based on a priority factor assigned to each node. For example, level determiner 302 determines a hierarchy of nodes with a number of levels in the first graph from a source node and a target node. As discussed above, the priority factor may reflect the importance of the node, such as factors measuring edge difference and uniformity consideration. Alternatively, factors relevant to global measurement indicating some path based centrality measurements can be used to determine the level of the node. In one example, cost of queries as indicated by the size of the query search spaces, can be used to determine the priority factors.

In another example, cost of contraction can be used as priority factor in a hierarchical contraction method. In a hierarchical contraction method, given that the time consuming part of the contraction may be the forward shortest-path searches to decide the necessity of shortcuts, the sum of these search space sizes may be used as a priority term. Once the levels of nodes are determined, a hierarchy may be constructed by contracting the nodes following the order of the levels of the nodes. A node v may be contracted by removing it from the network in such a way that shortest paths in the remaining overlay graph are preserved. This goal may be achieved by replacing paths of the from nodes u, v, w by a shortcut edge from nodes u and w. The shortcut u, w may be required if u, v, w is the only shortest path from u to w.

Figure 6:
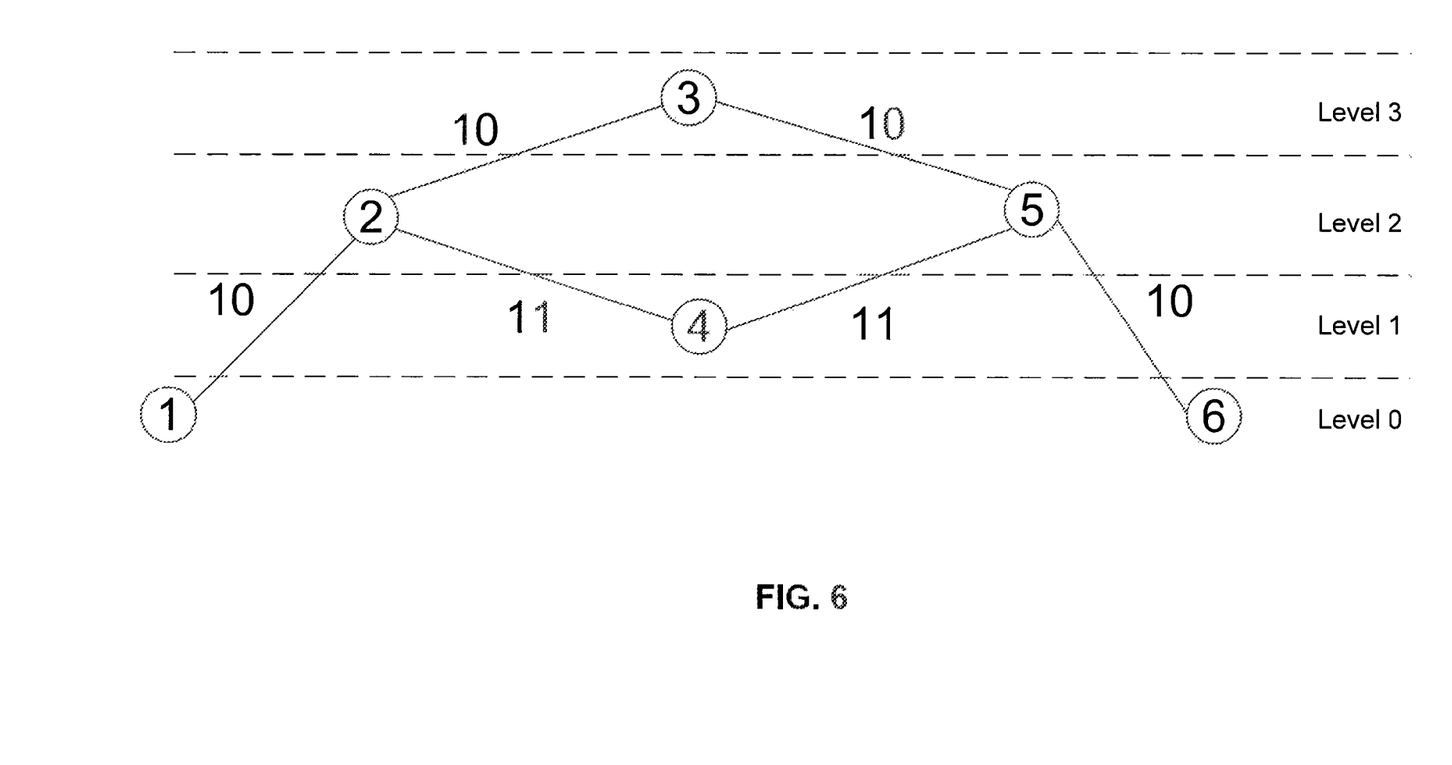
FIG. 6 is an illustration of example graph suitable to be reduced using an alternate directions module, according to an embodiment.

An example hierarchical graph with six nodes connected by arcs is illustrated in FIG. 6. The height of the node may represent its level in the hierarchical graph. In this example, nodes 1 and 6 are on the lowest level and node 3 is on the highest. The costs are shown on the arcs connecting the nodes.

At stage 404, a first shortest path between the source node and the target node is calculated traversing a meeting node in the first graph, with each node in the first shortest path traversing to a node of an equal or higher level in the direction from the source node to the meeting node and from the target node to the meeting node. For example, first path calculator 304 calculates the first shortest path between the source node and the target node in the first graph. Alternatively, first graph calculator 304 calculates the first shortest path between the source node and the target node in the reduced graph in the similar fashion as illustrated at stage 408 below.

Consider a query from source node 1 to target node 6 in the example illustrated in FIG. 6. The forward search finds the path 1→2→3 and the backward search the path 3→5→6. Both searches meet at node 3. Therefore, the shortest path is 1→2→3→5→6 of total cost 40.

At stage 406, the number of levels in the first graph is reduced to consolidate one or more levels of the first graph to form reduced levels in a second reduced graph. For example, level reducer 306 reduces one or more levels of first graph to generate a reduced second graph. Due to the fact that the forward and the backward searches traverse nodes in the same or higher levels as they evolve, reducing levels increases the number of meeting nodes the forward and backward searches find.

For example, in FIG. 6, the path 1→2→4→5→6 of total cost 42 may be a good alternate because it is sufficiently different and not much longer than the shortest path with a cost 40. However, the search of the first graph does not find this alternate because the forward search uses arcs in the same or higher levels in an upwards direction. Thus, the arc from node 2→4 is never used because it goes in a downward direction. Likewise, for the backward search, the arc 5←4 is never used because it goes in a downward direction. With level reduction generated in the second reduced graph, nodes 2, 4, and 5 may be reduced into a single level, and the search can use the arcs 2→4 and 5←4 to find the meeting node 4 and thus the concatenated alternate path 1→2→4→5→6.

In one embodiment, the hierarchy of nodes in the first graph contain a first level including nodes within a first range of priority values and a second level including nodes within a second range of priority values. Stage 406 can further determine the second reduced graph to include a level containing both the nodes within the first range of priority values and the nodes within the second range of priority values.

In another embodiment, the levels can be further reduced or modified to provide additional alternate routes. For example, forward and backward searches in the second reduced graph may go down even further in the reduced hierarchy on the first 5 arcs that the searches encounter and lead to a lower level. This may be necessary in cases where the source node or target node is already high up in the hierarchy and there is a need for a mechanism to further traverse down the reduced levels to have a sufficiently large search space. One skilled in the relevant art will recognize that the number 5 is arbitrary and the number of levels for further reduction in the already reduced graph may be modified according to the specific need and characteristics of the graph processed.

According to a preliminary comparison conducted for the highway hierarchical method (HH) and a contraction hierarchical method (CH), the time required to compute alternates is comparable between HH and CH. However, CH may answer shortest-paths-only-without-alternates queries much faster than HH.

With the levels of the nodes reduced in the second reduced graph, at stage 408, one or more second shortest paths between the source node and the target node traversing one or more meeting nodes in the second reduced graph is calculated. As mentioned above, the first shortest path can be calculated either in the first graph or the second reduced graph. Similar to the operations in stage 404, each node in the second shortest paths may traverse to a node of an equal or higher reduced level in the direction from the source node to the meeting nodes and from the target node to the meeting nodes. For example, second path calculator 308 calculates one or more second shortest paths between the source node and the target nodes.

Figure 7A:
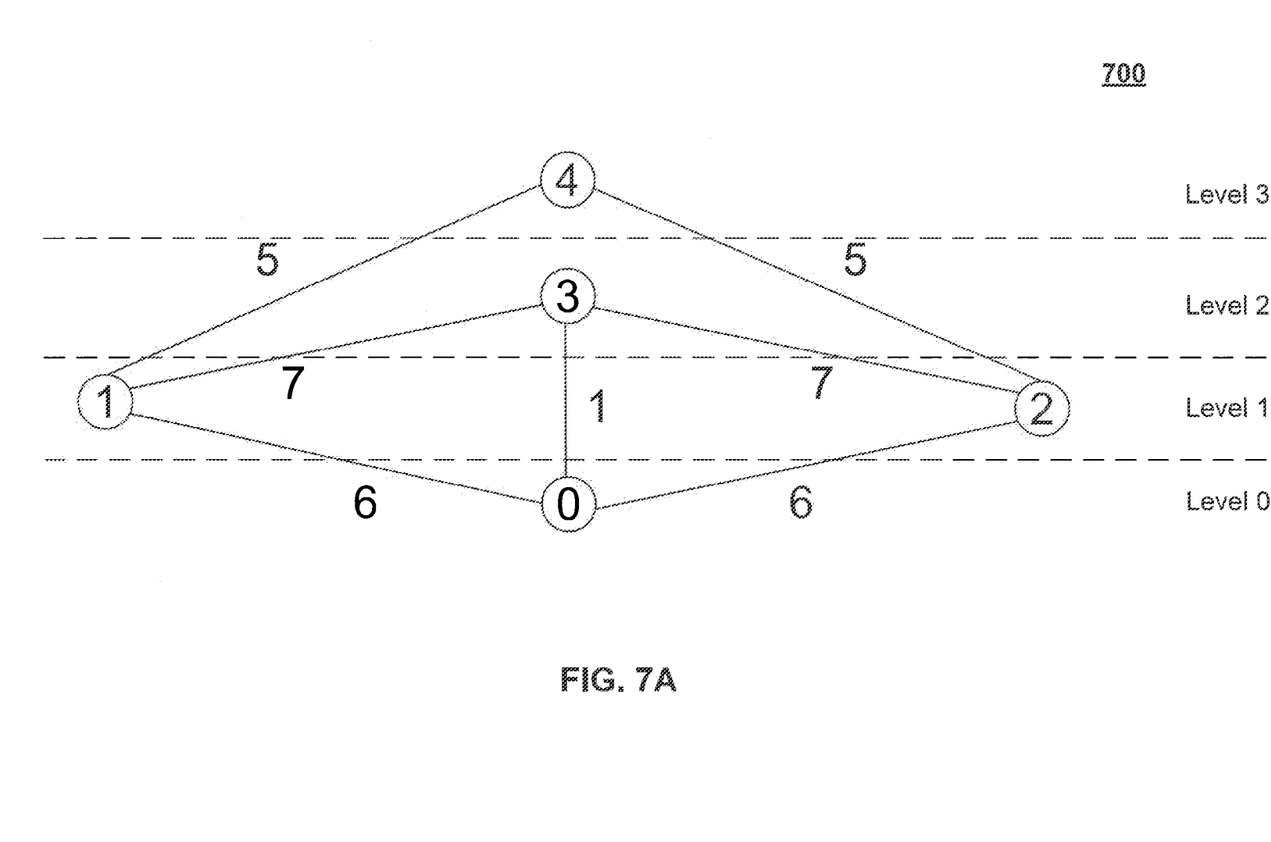
FIGS. 7A-7B illustrate modification of the alternate routes using an alternate directions module, according to an embodiment.

FIGS. 7A-7B are illustrations of modification of the alternate routes using an alternate directions module, according to an embodiment. Graph 700 in FIG. 7A, illustrates a 5-node road network with source node 1 and target node 2. Node 0 is at level 0, while nodes 1 and 2 are at level 1, node 3 is at level 2 and node 4 is at level 3, respectively.

Figure 7B:
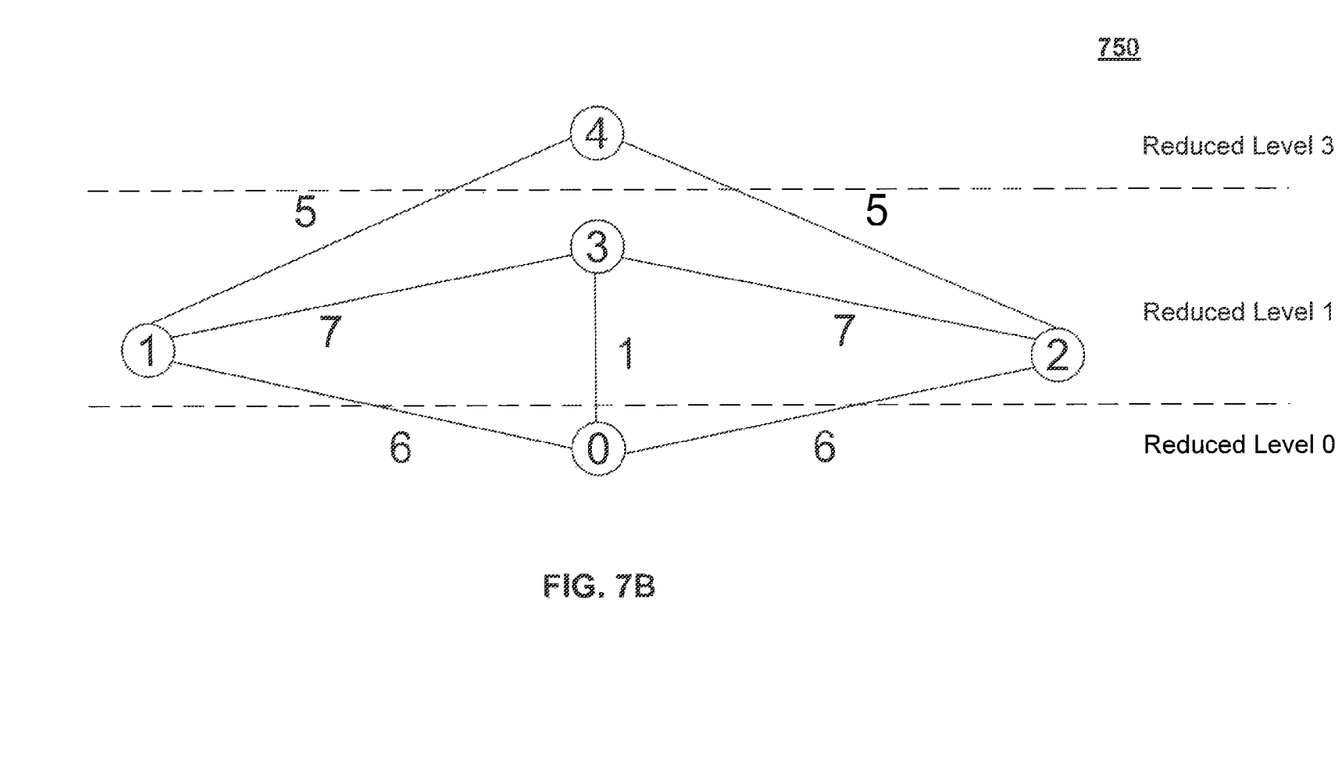

Graph 700 is transformed into a graph 750 in FIG. 7B using an embodiment of the present disclosure. As the result of the reduction, node 0 is at the reduced level 0, and nodes 1, 2 and 3 are at the reduced level 1 and node 4 is at reduced level 2. The shortest path from node 1 to node 2 is 1→4→2 with cost 10, while the alternate is path 1→3→2 with node 3 being identified as a meeting node. Notably, node 0 is not identified as a meeting node in the bidirectional search, because it resides on a lower reduced level than that of the source and target nodes.

Further shown in FIG. 7B, arc 1→3 is a shortcut for the path 1→0→3, and arc 3→2 is a shortcut for the path 3→0→2. Accordingly, path 1→3→2 can be replaced by path 1→0→3→0→2. However, given that path 1→0→3→0→2 includes a meaningless U-turn, such alternate is less desirable than path 1→0→2, which skips the U-turn.

This better alternate 1→0→2 selects node 0 as the new meeting node, which can be identified by unpacking path 1→3→2 and replacing the shortcuts with alternative paths. For example, path 1→3→2 is replaced by path 1→0→3→0→2. Furthermore, nodes located within a threshold range to the left and right of the initial meeting node 3 can be considered as potential new meeting nodes. For instance, the potential new meeting nodes can be found moving left and right 5% of the total distance of the shortest path from the initial meeting nodes. A person skilled in the relevant art would appreciate that 5% is for illustration purpose only and not intended to limit. In the similar fashion, multiple new meeting nodes can be identified, which correspond to multiple potential alternate routes. Subsequently, the potential alternate routes can be further ranked and filtered according to the tuning parameters such as query time associated with the number of alternate routes identified using such query. In the example of FIG. 7B, with node 0 being found as the new meeting node, the second shortest path can be modified concatenating two shortest paths from node 1 to node 0 and from node 0 to 2 to obtain the second shortest path 1→0→2. Because the initial alternate 1→3→2 is associated with cost 14 and the modified alternate 1→0→2 has cost 12, after unpacking and modification of the initial alternate to locate new meeting node, a more desirable alternate 1→0→2 is obtained.

At stage 410, with the first shortest path obtained from stage 404 and the second shortest paths obtained from stage 408, the first shortest path is assigned as a primary route and the one or more second shortest paths are assigned as alternate routes. For example, path assignor 310 assigns a primary route and one or more alternate routes. One or more second paths may be filtered to ensure that they are sufficiently different from the primary shortest path and they are not much longer than the primary shortest path. Additional filtering criteria may be applied to further restrict the number of alternate routes.

Example Computer System Implementation

Embodiments shown in FIGS. 1-4, and 6, or any part(s) or function(s) thereof, may be implemented using hardware, software modules, firmware, tangible computer readable media having instructions stored thereon, or a combination thereof and may be implemented in one or more computer systems or other processing systems.

Figure 5:
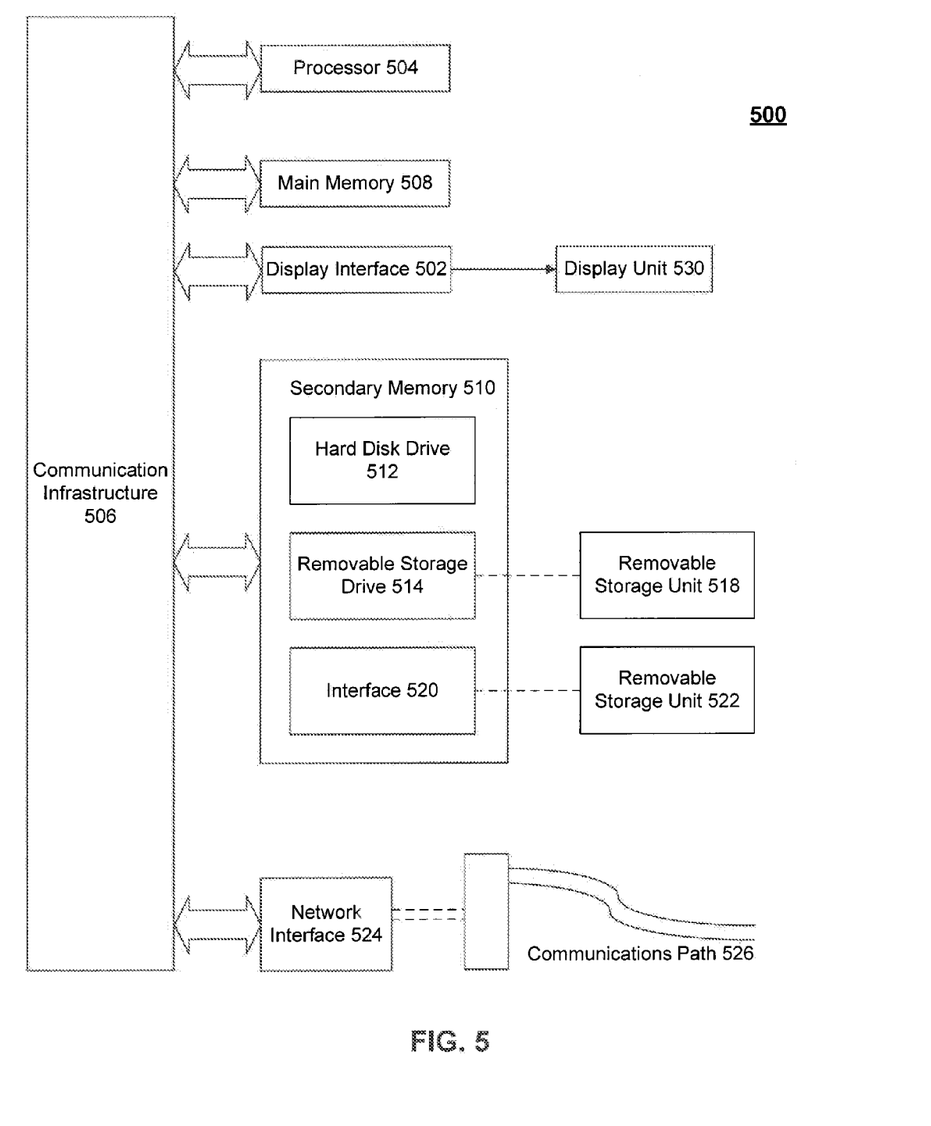
FIG. 5 is a diagram of an example computer system in which embodiments can be implemented.

FIG. 5 illustrates an example computer system 500 in which embodiments, or portions thereof, may be implemented as computer-readable code. For example, alternate directions module 130, including, its components, as shown in FIG. 3 can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 50. After reading this description, it will become apparent to a person skilled in the relevant art how to implement embodiments of the invention using other computer systems and/or computer architectures. Although operations may be described as a sequential process, some of the operations may in fact be performed in parallel, concurrently; and/or in a distributed environment, and with program code stored locally or remotely for access by single or multi-processor machines. In addition, in some embodiments the order of operations may be rearranged without departing from the spirit of the disclosed subject matter.

Processor device 504 may be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a network interface 524. Network interface 524 allows software and data to be transferred between computer system 500 and external devices. Network interface 524 may include a modem, a network interface (such as an Ethernet card), a communications port, a PCMCIA slot and card, or the like. Software and data transferred via network interface 524 may be in the form of signals, which may be electronic, electromagnetic, optical, or other signals capable of being received by network interface 524. These signals may be provided to network interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via network interface 524. Such computer programs, when executed, enable computer system 500 to implement embodiments as discussed herein. In particular, the computer programs, when executed, enable processor device 504 to implement the processes of embodiments of the present invention, such as the stages in the method illustrated by flowchart of FIG. 4, discussed above. Accordingly, such computer programs represent controllers of the computer system 500. Where embodiments are implemented using software, the software may be stored in a computer program product and loaded into computer system 500 using removable storage drive 514, interface 520, hard disk drive 512, or network interface 524.

Embodiments of the invention also may be directed to computer program products comprising, software stored on any computer useable medium. Such software, when executed in one or more data processing device(s), causes a data processing device(s) to operate as described herein. Embodiments of the invention employ any computer useable or readable medium. Examples of computer readable storage mediums include, but are not limited to, primary storage devices (e.g., any type of random access memory), and secondary storage devices (e.g., hard drives, floppy disks, CD ROMS, ZIP disks, tapes, magnetic storage devices, and optical storage devices, MEMS, nano-technological storage device, etc.).

CONCLUSION

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for determining shortest paths between a source node and a target node in a graph comprising:

determining a hierarchy of nodes with a number of levels contained in a first graph comprising a number of nodes interconnected by a number of arcs, each of the number of nodes in the hierarchy of nodes assigned to a level of the number of levels based on a priority factor of the node;

calculating a first shortest path between the source node and the target node traversing a meeting node in the first graph, wherein each node in the first shortest path traverses to a node of an equal or higher level of the number of levels in the direction from the source node to the meeting node and from the target node to the meeting node;

reducing the number of levels in the first graph, wherein two or more levels of the first graph are consolidated into a consolidated level to form reduced levels in a second graph, wherein a number of reduced levels in the second graph is less than the number of levels in the first graph, wherein a number of nodes and a number of arcs in the second graph is the same as the number of nodes and the number of arcs in the first graph, and wherein the nodes assigned to the two or more levels of the first graph are assigned to the consolidated level of the second graph;

calculating one or more second shortest paths between the source node and the target node traversing one or more meeting nodes in the second graph, wherein each node in the second shortest paths traverses to a node of an equal or higher reduced level of the reduced levels in the direction from the source node to the meeting nodes and from the target node to the meeting nodes; and assigning the first shortest path as a primary route and the one or more second shortest paths as alternate routes.

2. The computer-implemented method of claim 1, wherein the first and the second graphs correspond to road networks.

3. The computer-implemented method of claim 1, wherein the calculating a first shortest path further comprises:
  calculating a first shortest path between the source node and the target node traversing a meeting node using bidirectional Dijkstra search.

4. The computer-implemented method of claim 3, wherein the bidirectional Dijkstra search includes a forward search and a backward search, wherein the forward search and the backward search meet at the meeting nodes.

5. The computer-implemented method of claim 1, wherein the calculating a first shortest path further comprises:
  calculating a first shortest path between the source node and the target node using a Contraction Hierarchies algorithm.

6. The computer-implemented method of claim 1, wherein the calculating a first shortest path further comprises:
  calculating a first shortest path between the source node and the target node using a Highway Hierarchies algorithm.

7. The computer-implemented method of claim 1, wherein the assigning further comprises:
  filtering the alternate routes to ensure that the alternate routes are different from the primary route.

8. The computer-implemented method of claim 1, the assigning further comprises:
  filtering the alternate routes to ensure that the alternate routes do not exceed a threshold in distance comparing with the primary route.

9. The computer-implemented method of claim 1, wherein a lowest reduced level in the second graph contains more levels of nodes corresponding to the levels representing the hierarchy of nodes in the first graph than any other level.

10. The computer-implemented method of claim 1, wherein the determining the hierarchy of nodes with the number of levels further comprises:
  preprocessing the first graph to order the nodes into different levels of hierarchies according to the priority factor assigned to each node.

11. The computer-implemented method of claim 1, wherein the two or more levels of the first graph include a first level including nodes within a first range of priority values and a second level including nodes within a second range of priority values, and the consolidated level includes the nodes within the first range of priority values and the nodes within the second range of priority values.

12. The computer-implemented method of claim 1, further comprising:
  unpacking shortcuts in the second shortest paths in the second graph;
  selecting nodes within a threshold distance from one or more meeting nodes in the second graph as new meeting nodes; and
  modifying the second shortest paths to concatenate shortest paths from the source node to the new meeting nodes and from the new meeting nodes to the target node.

13. A system for determining shortest paths between a source node and a target node in a graph, comprising:
  a level determiner, implemented by one or more computing devices, configured to determine a hierarchy of nodes with a number of levels contained in a first graph comprising a number of nodes interconnected by a number of arcs, each of the number of nodes in the hierarchy of nodes assigned to a level of the number of levels based on a priority factor of the node;
  a first path calculator, implemented by the one or more computing devices, configured to calculate a first shortest path between the source node and the target node traversing a meeting node in the first graph, wherein each node in the first shortest path traverses to a node of higher level of the number of levels in the direction from the source node to the meeting node and from the target node to the meeting node;
  a level reducer, implemented by the one or more computing devices, configured to reduce the number of levels in the first graph, wherein two or more levels of the first graph are consolidated into a consolidated level to form reduced levels in a second graph, wherein a number of reduced levels in the second graph is less than the number of levels contained in the first graph, wherein a number of nodes and a number of arcs in the second graph is the same as the number of nodes and the number of arcs in the first graph, and wherein the nodes assigned to the two or more levels of the first graph are assigned to the consolidated level of the second graph;
  a second path calculator, implemented by the one or more computing devices, configured to calculate one or more second shortest paths between the source node and the target node traversing one or more meeting nodes in the second graph, wherein each node in the second shortest paths traverses to a node of higher reduced level of the reduced levels in the direction from the source node to the meeting nodes and from the target node to the meeting nodes; and
  a path assignor, implemented by the one or more computing devices, configured to assign the first shortest path as a primary route and the one or more second shortest paths as alternate routes.

14. The system of claim 13, wherein the first and the second graphs correspond to road networks.

15. The system of claim 13, wherein the first path calculator is further configured to:
  calculate a first shortest path between the source node and the target node traversing a meeting node using bidirectional Dijkstra search.

16. The system of claim 15, wherein the bidirectional Dijkstra search includes a forward search and a backward search, wherein the forward search and backward search meet at the meeting nodes.

17. The system of claim 13, wherein the first path calculator is further configured to:
  calculate a first shortest path between the source node and the target node using a Contraction Hierarchies algorithm.

18. The system of claim 13, wherein the first path calculator is further configured to:
  calculate a first shortest path between the source node and the target node using a Highway Hierarchies algorithm.

19. The system of claim 13, wherein the path assignor is further configured to:
  filter the alternate routes to ensure that the alternate routes are different from the primary route.

20. The system of claim 13, wherein the path assignor is further configured to:
  filter the alternate routes to ensure that the alternate routes do not exceed a threshold in distance comparing with the primary route.

21. The system of claim 13, wherein the lowest reduced level in the second graph comprises a consolidation of more levels of the first graph than any other reduced level.

22. The system of claim 13, wherein the level determiner is further configured to:
  preprocess the first graph to order the nodes into different levels of hierarchies according to the priority factor assigned to each node.

23. The system of claim 13, wherein the two or more of levels of the first graph include a first level including nodes within a first range of priority values and a second level including nodes within a second range of priority values, and the consolidated level includes the nodes of the first level and nodes of the second level.

24. The system of claim 13, further comprising:
a path modifier, implemented by the one or more computing devices, configured to:
unpack shortcuts in the second shortest paths in the second graph;
select nodes within a threshold distance from one or more meeting nodes in the second graph as new meeting nodes; and
modify the second shortest paths to concatenate shortest paths from the source node to the new meeting nodes and from the new meeting nodes to the target node.

25. An apparatus comprising a non-transitory computer readable storage medium having instructions encoded thereon that, when executed by a processor, cause the processor to perform operations comprising:
determining a hierarchy of nodes with a number of nodes and a number of levels contained in a first graph comprising the number of nodes interconnected by a number of arcs, each node in the hierarchy of nodes assigned to a level of the number of levels based on a priority factor of the node;
calculating a first shortest path between the source node and the target node traversing a meeting node in the first graph, wherein each node in the first shortest path traverses to a node of higher level of the number of levels in the direction from the source node to the meeting node and from the target node to the meeting node;
reducing the number of levels in the first graph, wherein two or more levels of the first graph are consolidated into a consolidated level to form reduced levels in a second graph, wherein a number of reduced levels in the second graph is less than the number of levels contained in the first graph, wherein a number of nodes and a number of arcs in the second graph is the same as the number of nodes and the number of arcs in the first graph, and wherein the nodes assigned to the two or more levels of the first graph are assigned to the consolidated level of the second graph;
calculating one or more second shortest paths between the source node and the target node traversing one or more meeting nodes in the second graph, wherein each node in the second shortest paths traverses to a node of higher reduced level of the reduced levels in the direction from the source node to the meeting nodes and from the target node to the meeting nodes; and
assigning the first shortest path as a primary route and the one or more second shortest paths as alternate routes.

* * * * *